United States Patent [19]

Allen et al.

[11] 4,168,231
[45] Sep. 18, 1979

[54] METHOD AND APPARATUS FOR RECYCLING WATER IN A CAR WASH

[76] Inventors: Mark K. Allen, 1120 Granvia Altamira, Palos Verdes Estates; Roland S. Weber, 32201 Valor Pl., Rancho Palos Verdes, both of Calif. 90274

[21] Appl. No.: 974,218

[22] Filed: Dec. 29, 1978

Related U.S. Application Data

[63] Continuation-in-part of Ser. No. 858,651, Dec. 8, 1977.

[51] Int. Cl.² .............................................. B01D 45/16
[52] U.S. Cl. ........................................ 210/74; 210/84; 210/136; 210/167; 210/194; 210/512 M
[58] Field of Search ...................... 210/74, 84, 90, 167, 210/194, 512 R, 512 M, 136; 15/DIG. 2

[56] References Cited
U.S. PATENT DOCUMENTS

| | | | |
|---|---|---|---|
| 2,324,763 | 7/1943 | Carruthers | 210/730 W |
| 2,381,760 | 8/1945 | Latham, Jr. | 210/74 |
| 2,706,045 | 4/1955 | Large | 210/512 R |
| 2,928,268 | 3/1960 | Hetzer | 210/167 X |
| 3,543,932 | 12/1970 | Rastatter | 209/211 |
| 3,774,625 | 11/1973 | Wiltrout | 210/167 X |
| 3,923,658 | 12/1975 | Lancaster | 210/167 X |

*Primary Examiner*—William A. Cuchlinski, Jr.
*Attorney, Agent, or Firm*—Lewis B. Sternfels

[57] ABSTRACT

A pump supplies water from a clarifier tank to a centrifugal separator, where solid particles are removed, and then to wash spray heads. A return or bypass conduit with a pressure-operated, modulating one-way valve permits water to pass from the outlet of the separator to the inlet of the pump in sufficient volume to ensure that the separator will operate at high velocity even when there is little or no demand for processed water at the spray heads as well as to recycle centrifuged water to further clean it. A float tank is coupled to and extends from the return conduit for enabling any trapped air to be expelled from the system. In addition, an air-bleeding conduit with a one-way check valve therein is placed in parallel with the return conduit to permit air flow in the direction opposite to that allowed by the valve therein to enable air to be removed from the system, especially when the pump is primed by supply of additional water thereto.

8 Claims, 4 Drawing Figures

METHOD AND APPARATUS FOR RECYCLING WATER IN A CAR WASH

CROSS REFERENCE

This is a continuation-in-part of our copending patent application, Ser. No. 858,651, filed Dec. 8, 1977.

BACKGROUND OF THE INVENTION

The present invention relates to a method and apparatus for recycling water in a car wash.

The possibility or existence of drought conditions presents potential or present requirement to conserve water, as well as its attendant necessity to conserve energy. For example, it is desirable or, at times obligatory, to conserve water in the operation of a car wash in order to stay in business, especially when water is scarce. In addition, any customer reluctance to use a car wash tends to be overcome when they are aware that water is being recycled. Thus, the car wash volume can be kept high in spite of drought or rationing.

Also, when the customers are aware that the recycled water in the car wash is being cleaned, their fear that their cars' finish will be ruined by dirt particles is alleviated. They will have the assurance that even fine, otherwise damaging, particles have been removed in the recycling process.

Aside from such considerations of water rationing, recycling water and soap can be profitable, e.g., by cutting water costs up to 70 percent and soap costs up to 90 percent. Such savings can pay for a water reclaim unit in a matter of months.

There have been many water reclaim systems devised, e.g., see U.S. Pat. No. 3,774,625. Such systems, however, are expensive as they require additional water storage or reclaim pits, pumps, conduits, valves and assorted hardware, all of which increase the cost of the system both in terms of capital outlay and installation and repair service.

Accordingly, an object of the present invention is to provide a simple, low-cost and reliable water reclaim unit which will provide a continuous supply of cleaned or processed water to scrubbing areas as well as to the pre-rinse area of a car wash, without the need for extensive and costly accessory equipment. Depending on the car wash system, a supply of between 50 and 160 gallons per minute will be required.

Another object of the invention is the provision of a water reclaim unit which has few moving parts and does not require the cleaning of filters, backwashing and disassembly.

Another object is the provision of means by which air can be effectively eliminated from the system.

SUMMARY OF THE INVENTION

In accordance with these and other objects of the invention, there is provided a water reclaim unit having a pump which draws water from a clarifying tank by way of a foot valve, and which supplies it to a centrifugal separator where, in one continuous action, solid particles are expelled and discharged. To keep the separator always operating at high velocity even when the demand for processed water is small or absent, a return or feedback conduit with a pressure-operated one-way valve therein connects the outlet of the separator to the inlet of the pump. Thus, the pump operates both to recycle water through the feedback conduit and to supply cleaned water to the car wash spray heads. A priming valve may be secured to the inlet of the pump to prime it. A float tank extends from the feedback circuit for expelling trapped air from the system. An air-bleeding circuit with a one-way check valve therein is connected in parallel with the feedback circuit and permits air flow in a direction opposite thereto. The air-bleeding circuit is coupled to the float tank so that any air in the circuit also may be expelled therefrom, especially when fresh water is supplied thereto during priming of the pump. Gauges may be provided at the outlets of the separator and the pump so that pressures indicated by the gauges may be used to calculate the volume of water being bypassed, or the volume of water being used by the car wash. For higher volume, twin centrifugal separators connected in parallel may be used.

BRIEF DESCRIPTION OF THE DRAWINGS

The foregoing and other objects and features of the present invention can be more readily understood with reference to the following detailed description, taken in conjunction with the accompanying drawings, wherein like reference numerals designate like structural element, and in which.

DETAILED DESCRIPTION OF THE INVENTION

Figure 1:
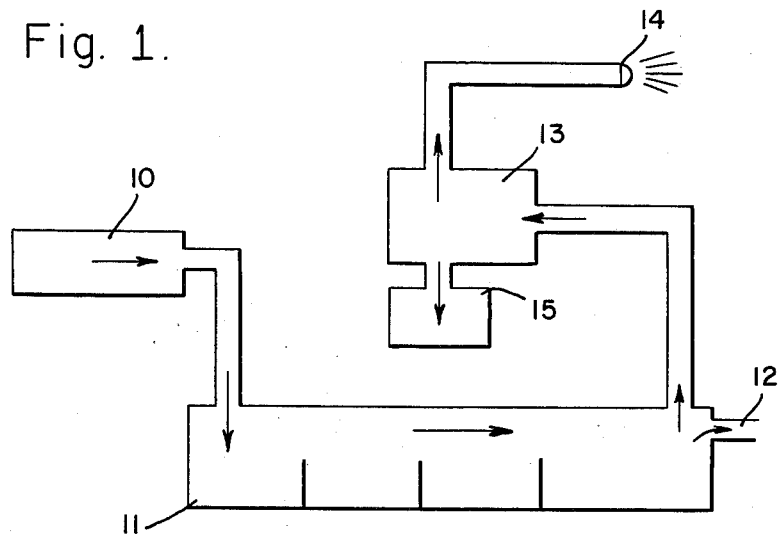
FIG. 1 is a diagram of the drain system of a conventional car wash having an embodiment of the water reclaim unit of the present invention installed therein.

Referring now to FIG. 1 of the drawings, there is shown a diagram of the drain system of a conventional car wash having an embodiment of the water reclaim unit of the present invention installed therein. Arrows indicate the direction of flow in the system. The car wash drain system is provided with a drain trench 10 which collects the soiled water which runs from the car being washed. In actual practice, there is usually one drain trench 10 running the full length of the car wash.

The soiled water is conducted from drain trench 10 to a clarifying tank 11, from which it drains through a sewer outlet 12 into the city sewage system. The clarifying tank is usually required by city regulations to remove dirt particles from the water prior to its discharge into the city sewage system. It comprises a series of settling tanks separated by baffles.

A water reclaim unit 13, in accordance with the present invention, pumps soiled water from usually the last, or next to the last, section of clarifying tank 11. Water reclaim unit 13 cleans the soiled water and provides the processed water to the scrubbing section of the car wash, indicated in FIG. 1 as a nozzle 14 emitting a spray. The solid particles which are removed from the soiled water by water reclaim unit 13 may be discharged into a sump or sludge receptacle 15.

Depending on the specific gravity of the solid particles contained in the soiled water, water reclaim unit 13 may remove particles as small as about 10 microns.

Such particles may consist of ferrous and heavy non-ferrous materials. Lighter particles as small as about 70 microns are also removed. Soap usually remains in the processed water so that, if it were used in the final rinse section of the car wash, it would tend to leave a soap film on the cars. Accordingly, fresh water, rather than processed water, is generally used in the final rinse area. The processed water is used in the scrubbing areas, which are conventionally the pre-rinse, brush and curtain areas of the car wash.

By employing the water reclaim unit of the present invention, water costs are cut up to substantially 70 percent, and soap costs are cut up to substantially 90 percent. At the same time, water reclaim unit 13 protects the finish of the cars being washed. If the soiled water were recycled without first removing the solid particles, it might cause a sandblasting effect in the pre-rinse area and a sandpaper effect in the brush and curtain areas. For example, ferrous particles and some non-ferrous particles, such as sand, tend to adhere to brushes and curtains, where they eventually become embedded and thereafter act much like sandpaper.

Figure 2:
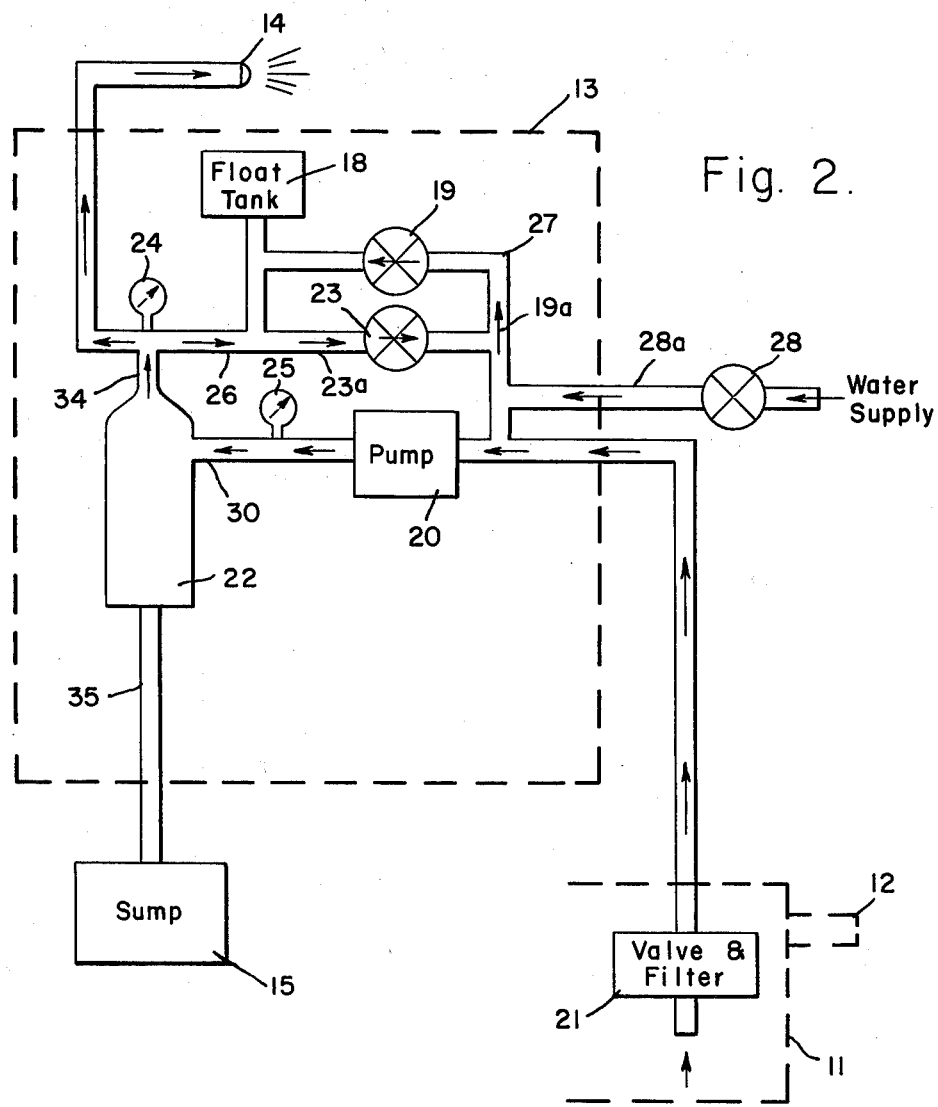
FIG. 2 is a diagram of the water reclaim unit of FIG. 1 showing the elements thereof and their interconnections.

Referring now to FIG. 2 of the drawings, water reclaim unit 13 includes a pump 20 which pumps soiled water from clarifying tank 11. The soiled water is drawn into the water reclaim unit through a foot valve 21 which is located in clarifying tank 11. Foot valve 21 comprises a strainer or screen and a check valve. The inlet of the pickup tube is disposed so as to admit water far enough below the surface so as not to ingest the sludge floating on the surface of the water in the clarifying tank.

Pump 20 pumps the soiled water to an inlet 30 of a high-velocity, centrifugal separator or cyclone 22. Here, the dirty water whirls at high velocity, creating a central vortex in the separator from top to bottom. Solid-particle separation occurs at the circumference of the water stream, where gravity causes the solid particles to fall toward the bottom of separator 22 and through a solid discharge outlet 35 extending therefrom. At the center of the vortex, a powerful upward force is generated which rapidly elevates cleaned or processed water to an outlet 34 of the centrifugal separator. From this outlet, the processed water is conducted to the scrubbing section of the car wash, indicated by nozzle 14 emitting a spray.

As is known in the art, the scrubbing section of the car wash includes a number of valves which are operated by cars passing through the car wash. Consequently, the demand for water from water reclaim unit 13 is intermittent. When no cars are being washed, or when the cars are passing from area to area of the car wash, no water is turned on. To keep centrifugal separator 22 continuously operating at high velocity even when no processed water is being supplied to the car wash, a return or feedback circuit 26 with a one-way, pressure-operated modulating valve 23 therein connects the outlet of separator 22 to the inlet of pump 20.

Valve 23 causes the water to recirculate in the direction of arrows 23a in a loop including pump 20, separator 22, and bypass valve 23 in feedback circuit 26. The bypass valve is adjusted to provide typically an approximate 4-pound pressure drop across separator 22, which provides an approximate 50 gallon-per-minute flow rate in the recirculating loop at standby, that is, with no demand from the car wash. The substantially 50 gallon-per-minute flow rate keeps separator 22 operating at full efficiency regardless of the demand from the car wash.

The full capacity of water reclaim unit 13 with a 5 horsepower pump 20 is approximately 80 gallons per minute at 50 pounds pressure. With less than a 50 gallon-per-minute demand from the car wash, up to substantially 100 percent of the water recirculates through separator 22 again and again, which causes it to be up to substantially 99 percent efficient at cleaning the particulate matter from the processed water. Thus, when the spray nozzles have full demand for water, no water is bypassed through return conduit 26. When there is no demand for water at the spray nozzles, there is a 50 gallon-per-minute water flow through the return conduit. When there is less than a full demand for water at the spray nozzles, e.g., 30 gallons per minute, pressure operated valve 23 in return conduit 26 acts in a modulating manner to permit the remaining water, 20 gallons per minute in this example, to be returned to pump 20.

To enable one to set the pressure drop of 4 pounds across separator 22, first water pressure gauge 24 may be provided at the outlet of the centrifugal separator, and a second water pressure gauge 25 may be provided at its inlet. The pressure indicated by gauges 24 and 25 is used to calculate the volume of water being bypassed or the volume of water being used by the car wash.

If water drains out of separator 22 or pump 20 when water reclaim unit 13 is not operating, a vacuum lock may occur to prevent pump 20 from operating when the water reclaim unit is restarted. For such an eventuality, a conduit 28a with a priming valve 28 therein is connected into that part of feedback circuit 26 between bypass valve 23 and pump 20 to enable pump 20 to be primed.

In addition to the aforementioned problem of the possibility of water draining out of separator 22, there is also the possibility that a piece of brush bristle or other foreign object lodge in the check valve portion of foot valve 21 and keep the check valve partly open. Under this condition, when pump 20 stops, it is possible for pump 20 to lose its prime. Because of the nature of the integral bypass system, air would be recirculated, and pump 20 would be operating air-locked.

To overcome this problem, a float tank 18 comprising a chamber having a float valve is coupled to feedback circuit 26 above the outlet line of separator 22. The float valve in float tank 18 opens the system to the atmosphere when the water level in the float tank drops. When pump 20 is started with the water level low in float tank 18, the trapped air is expelled until the water level rises and shuts off the float valve.

An associated air lock problem also arises during the priming process when pump 20 is not operating and water is being fed into the system through valve 28. Specifically, valve 23 in feedback circuit 26 is a one-way valve which not only prevents flow of water towards the outlet of separator 22 but also does not permit escape of any air in the feedback circuit. Thus, air may become trapped in circuit 26 to prevent recirculation of water in the circuit, or the air may be passed to pump 20, causing it to lose its prime. To overcome this problem, an air-escape path 27 extends from feedback circuit 26, adjacent to the point where priming valve inlet 28a enters the feedback circuit, to float tank 18. A one-way check valve 19 is inserted in path 27 and permits passage of water and any air in a direction opposite from that permitted by valve 23, as denoted by arrows 19a. Thus, valve 19 permits any air to pass out of, or to be bled from, the system through float tank 18. After the desired priming, priming valve 28 is closed and, when pump 20 is activated, the pressure of pump 20 acts against one-way valve 19 precluding water from flowing through path 27. Without such an air-bleeding path 27, it may become impossible to properly prime pump 20 and to enable the system to operate.

Figure 3:
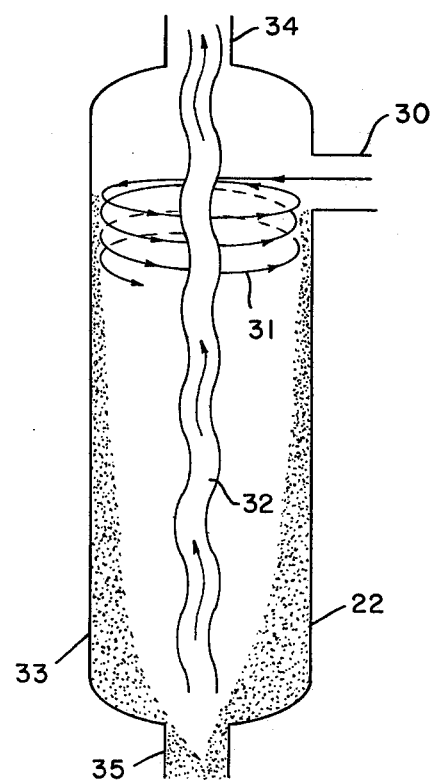
FIG. 3 is a drawing of a centrifugal separator employed in the water reclaim unit of FIGS. 1 and 2, showing its mode of operation.

FIG. 3 illustrates the operation of high-velocity centrifugal separator 22. It comprises a heavy-duty, steel, cylindrical, tank-like chamber having inlet 30 near the top at one side. Dirty water pumped into the separator whirls at high velocity around its sides in a path extending from near its top to its bottom. This centrifuge action is indicated at 31. As previously stated, this creates a central vortex 32 from top to bottom. Gravity causes solid particles 33 at the circumference of the separator to separate and fall downwardly as the intensity of the centrifugally whirling water increases. At the center of vortex 32, a powerful upward force is created which rapidly elevates the cleaned water to separator outlet 34 at its top. Solid particles 33 are flushed out solid-discharge outlet 35 at the bottom of separator 22.

Figure 4:
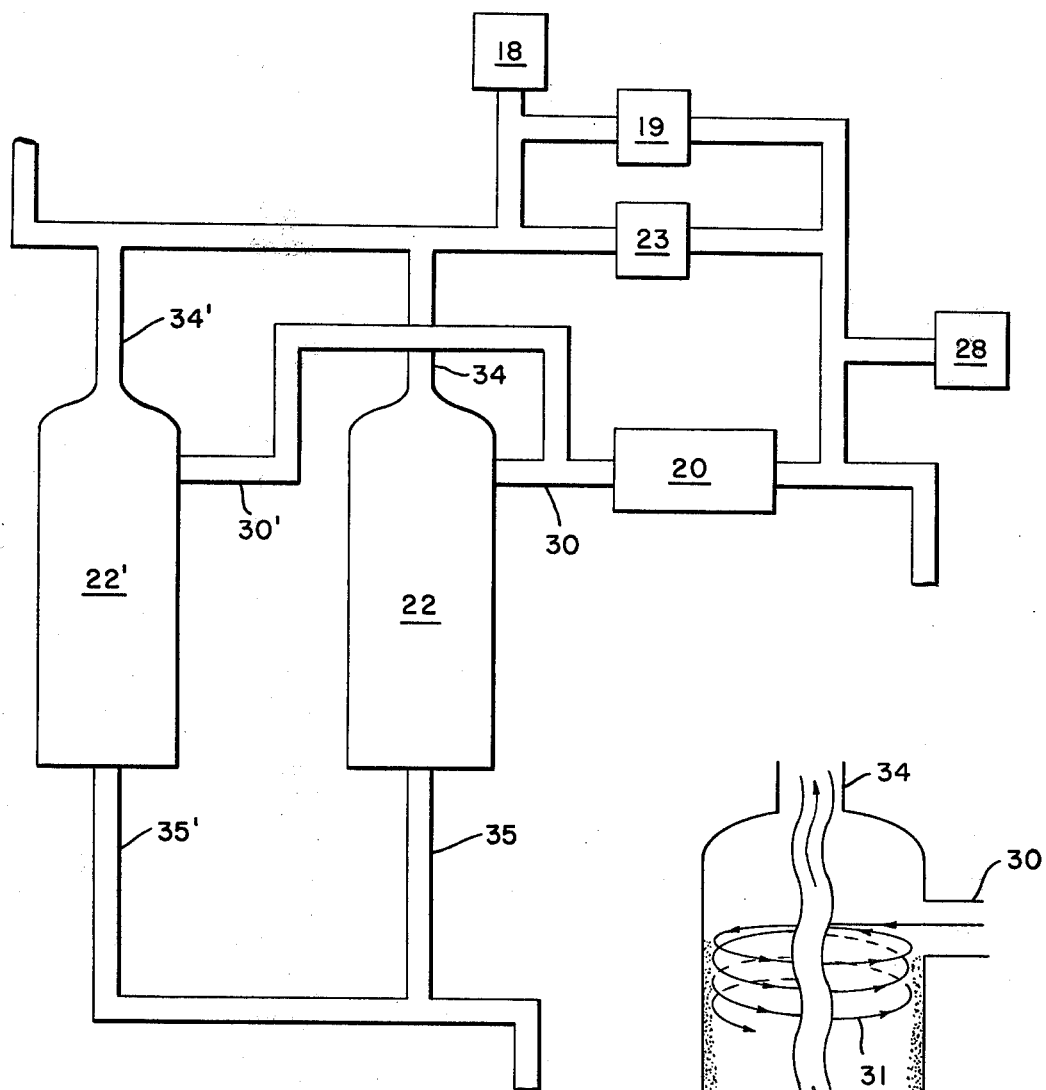
FIG. 4 is a diagram of a second embodiment of the invention having twin centrifugal separators operating in parallel.

FIG. 4 shows a second embodiment of the invention in which the outlet of pump 20 is also connected to an inlet 30' of a second separator 22' to provide twin separators 22 and 22' operating in parallel. The second separator is provided with its own solid-discharge outlet 35'. An outlet 34' of second separator 22' is also connected to bypass valve 23 and to the car wash. Whereas the first embodiment of the invention employing a single separator 22 has a capacity of 80 gallons per minute at 50 PSI using a 5 horsepower pump 20, the second embodiment employing twin centrifugal separators 22 and 22' has a capacity of 160 gallons per minute at 50 PSI using a 10 horsepower pump 20.

The only moving parts in water reclaim unit 13 are the pump and valves. The water is cleaned in a simple, continuous, centrifugal action without using filters or screens which must be cleaned or backwashed and which may require disassembly. Thus, the unit of the present invention is practically maintenance-free, simple and dependable. The savings in water and soap makes the unit of the present invention pay for itself in time. The only water loss occurs through carry-off, overflow and evaporation.

It is to be understood that the above-described embodiments of the invention are merely illustrative of the many possible specific embodiments which represent applications of the principles of the present invention. Numerous and varied other arrangements can be readily devised in accordance with these principles by those skilled in the art without departing from the spirit and scope of the invention.

What is claimed is:

1. Apparatus for recycling water in a car wash comprising:
    a pump having an inlet and an outlet for pumping soiled water from a car wash clarifying tank;
    a centrifugal separator coupled to the outlet of said pump for receiving soiled water therefrom and for cleaning the soiled water, said pump conducting cleaned water from an outlet of said separator to a car wash scrubbing section;
    a bypass circuit with a one-way, pressure-operated modulating valve coupling said separator outlet directly to said pump inlet for maintaining continuous operation of said separator at high velocity even when no processed water is being used by said car wash; and
    a sludge receptacle coupled to the bottom of said separator.

2. Apparatus according to claim 1 further comprising:
    a pair of water pressure gauges, one of said gauges being connected to said outlet of said separator, and the other of said gauges being connected to said inlet of said separator.

3. Apparatus according to claim 1 further comprising:
    a float tank coupled to said separator outlet for expelling trapped air from the system.

4. Apparatus according to claim 3 further comprising a priming valve coupled to said pump inlet, and a flow path parallel to said bypass circuit, said flow path including a one-way check valve operable to check fluid flow in a direction opposite from said pressure-operated modulating valve in said bypass circuit.

5. Apparatus according to claim 4 in which said flow path is coupled to said float tank.

6. Apparatus according to claim 5 further comprising a second centrifugal separator coupled to said pump outlet for receiving soiled water therefrom and for cleaning the soiled water, said pump conducting cleaned water from an outlet of said second separator to said car wash scrubbing section and to said bypass circuit.

7. The method for recycling water in a car wash comprising the steps of:
    pumping soiled water from a car wash clarifying tank to a centrifugal separator by means of a pump;
    supplying cleaned water by the pump from the processed-water outlet of the separator to a car wash scrubbing section; and
    recirculating cleaned water through a feedback circuit from the processed-water outlet of the separator directly to the inlet of said pump.

8. The method according to claim 7 further comprising the step of expelling air from the feedback circuit during operation of the pump and during priming of the pump.

* * * * *